May 27, 1924.

W. H. LEE

SULKY PLOW

Filed March 23, 1918   2 Sheets-Sheet 1

1,495,601

May 27, 1924.

W. H. LEE

SULKY PLOW

Filed March 23, 1918  2 Sheets-Sheet 2

1,495,601

INVENTOR
William H Lee.
BY
Parsons & Bodell.
ATTORNEYS

Patented May 27, 1924.

1,495,601

UNITED STATES PATENT OFFICE.

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

SULKY PLOW.

Application filed March 23, 1918. Serial No. 224,253.

*To all whom it may concern:*

Be it known that I, WILLIAM H. LEE, a citizen of the United States, residing at Syracuse, in the county of Onondaga and State of New York, have invented a certain new and useful Sulky Plow, of which the following is a specification.

This invention relates to sulky plows and has for its object particularly simple and efficient means for manually controlling the castering furrow wheel during turning of the plow and especially means whereby the lever or the handle end thereof and parts carried thereby for controlling the turning of the furrow wheel are always within easy reach of the seat during all angular positions of the furrow wheel. The invention consists in the novel features and in the combinations and constructions hereinafter set forth and claimed.

In describing this invention, reference is had to the accompanying drawings in which like characters designate corresponding parts in all the views.

Figure 1:
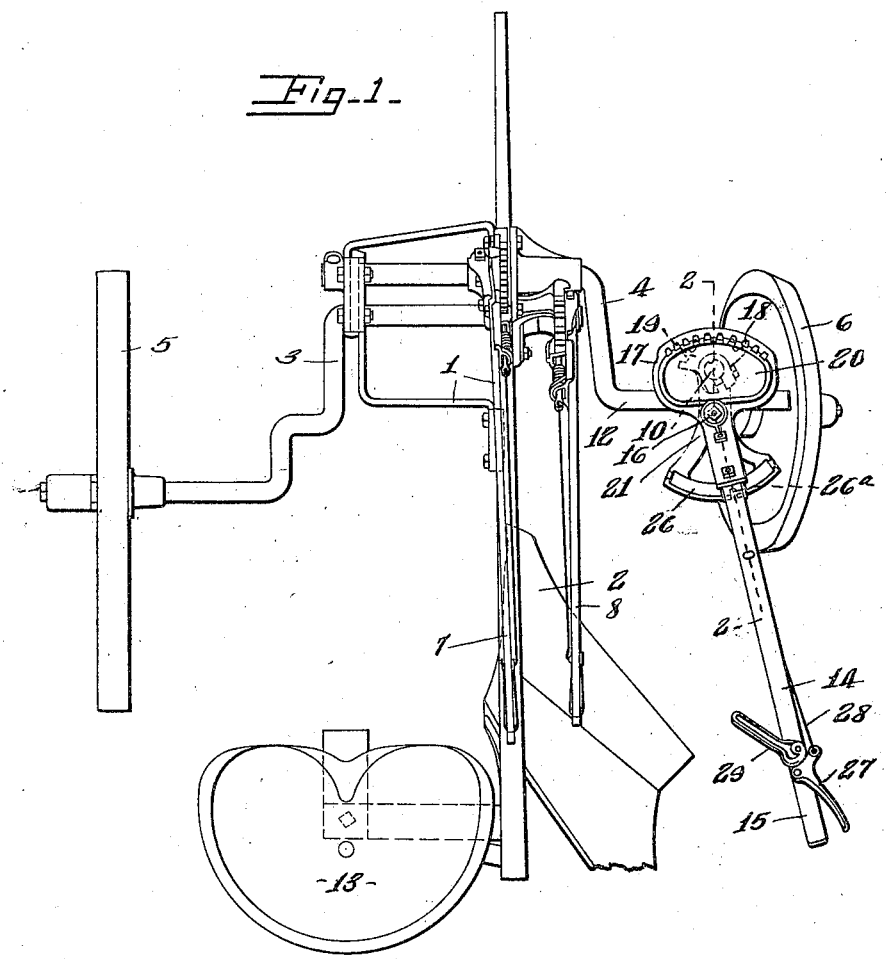
Figure 1 is a plan view of a sulky plow embodying my invention, parts being removed and parts being broken away.
Figure 2:
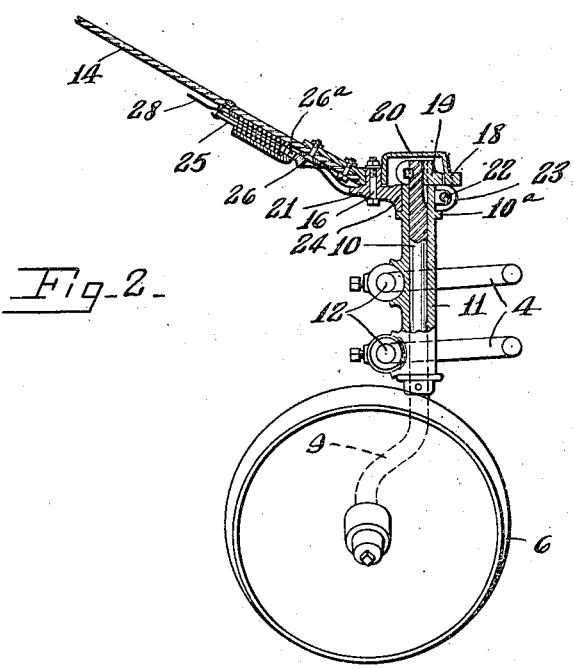
Figure 2 is a sectional view, partly in elevation, on the plane of line 2—2, Fig. 1.
Figure 3:
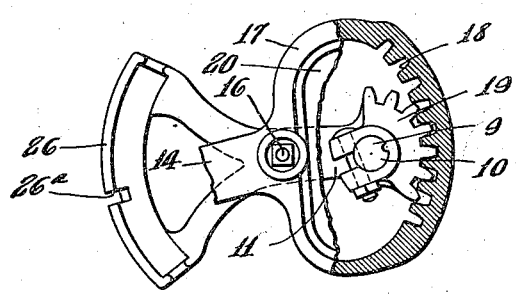
Figure 3 is an enlarged plan view, partly in section and partly broken away, of the lever for turning the furrow wheel and motion-transmitting and multiplying mechanism between the lever and the furrow wheel axle.

1 designates the frame of the plow which may be of any suitable form, size and construction.

2 is the plow bottom suitably carried by the frame.

3 and 4 are respectively, the crank axles upon which the land wheel 5 and the bearing supporting the furrow wheel 6 are mounted, there being two crank axles 4 arranged one above the other as will be understood by those skilled in the art. The crank axles are operated to raise and lower the plow bottom or otherwise change the position thereof by the usual levers 7, 8.

9 is the axle for the front furrow wheel 6, which axle has an upright or spindle portion 10 journaled in the upright bearing 11 in the frame mounted on the axial portion 12 of the axle 4. 13 is the driver's seat suitably supported by the frame.

14 is the lever for manually turning the furrow wheel about the axis of the upright portion 10 of the caster wheel axle 9 to change the angle of said wheel, the lever having its handle end 15 arranged within easy reach of the seat 13.

The lever 14 is pivoted between its ends on a vertical pivot 16 at a point eccentric to, or at one side of as to the rear of, the upright portion 10 of the axle of the furrow wheel 6, and one arm of the lever extends within reach of the seat, and the other arm 17 extends to the opposite side of the axle 10 to that on which the pivot 16 is located and is connected to the axle 10 by motion transmitting and multiplying mechanism which transmits a relatively great turning movement to the axle 10 to change the angle of the furrow wheel 6 upon a small movement of the handle end of the lever 14 or which reduces the movement of the handle end of the lever when the furrow wheel is castering. This mechanism comprises an internal rack 18 carried by the arm of the lever in front of the axle 10, and a segment gear 19 mounted on the axle 10 and meshing with the rack 18. The rack 18 is concentric with the pivot 16 of the lever. As here shown, the arm 17 is bifurcated and extends around the axle 10 and gear 19 and the rack is carried by the bifurcations. The arm 17 is also formed with a cap 20 which covers the rack 18 and gear 19. The gear 19 and a collar 10ª on the upright portion 10 act as upper and lower thrust bearings coacting with the ends of the bearing 11.

The lever 14 is pivoted to a support 21 carried on the bearing 11 and the support 21 is adjustable to different angular positions on said bearing. The support is secured in its adjusted position by a clamping screw or bolt 22 extending through ears 23 on the split collar 24 provided on the support and encircling the bearing 10.

Means is provided for holding the lever 14 and furrow wheel in any angular position, this means consisting of a spring pressed locking bolt 25 carried by the lever 14 and coacting with a sector 26 on the support 21, the sector having a central notch 26ª for normally locking the furrow wheel from castering. The bolt 25 is withdrawn by any suitable means as a grip lever 27 carried at the handle of the lever 14 and connected to the bolt 25 by a link 28. Said bolt 25 may be held in its unlocked position to permit the furrow wheel 6 to caster by suitable means as a cam lever 29 carried by the handle of the lever 14 and coacting with the grip lever.

In operation, the furrow caster wheel is normally locked from castering. When a corner is about to be turned the driver operates the cam lever 29 which acts on the grip lever to withdraw the bolt 25, the cam lever 29 also holding the grip lever in its operated position to lock the bolt out so that the furrow wheel may caster freely. After the corner is turned, the driver operates the cam lever to release the bolt so that when the wheel 6 casters to its normal position the bolt 25 snaps into the notch 26ª of the sector. When desired to turn the caster wheel by hand the operator withdraws the bolt 20ª by operating the grip lever 27 when he takes hold of the lever 14 to turn the same.

If the furrow wheel should not caster back to its starting position or should be held from castering out of its normal position when relieved of the holding action of the bolt 25, it can be turned by the handle 14.

Owing to the power transmitting and multiplying means between the lever and the axle 10, the handle of the lever 14 and cam and grip levers carried thereby never move out of reach of the driver's seat.

What I claim is:

1. In a sulky plow, the combination of a frame provided with an upright bearing, a furrow wheel, an axle upon which the furrow wheel is mounted having an upright portion journalled in said bearing, a support mounted on the bearing concentric with the axle, a lever pivoted near one end to the support eccentric to said upright portion of the axle and provided with a rack, a gear mounted on the upright portion of the axle and meshing with the rack, the lever extending rearwardly from the support and having its handle end located at one side of the seat, substantially as and for the purpose set forth.

2. In a sulky plow, the combination of a frame provided with an upright bearing, a furrow wheel, an axle upon which the furrow wheel is mounted having an upright portion journalled in said bearing, a support mounted on the bearing concentric with the axle, a lever pivoted near one end to the support eccentric to said upright portion of the axle and provided with a rack, a gear mounted on the upright portion of the axle and meshing with the rack, the lever extending rearwardly from the support and having its handle end located at one side of the seat, and a quadrant mounted on the bearing, the lever having a latch coacting with the quadrant, substantially as and for the purpose described.

3. In a sulky plow, the combination of a frame provided with an upright bearing, a furrow wheel, an axle upon which the furrow wheel is mounted having an upright portion journalled in said bearing, a support mounted on the bearing, a lever pivoted to the support eccentric to the upright portion of the axle and having arms extending on opposite sides of said upright portion, a rack connecting the outer ends of said arms, a gear mounted on the upright portion of the axle, and meshing with the rack, said lever extending rearwardly from its pivot and provided with a handle at its rear end, substantially as and for the purpose specified.

4. In a sulky plow, the combination of a frame provided with an upright bearing, a furrow wheel, an axle upon which the furrow wheel is mounted having an upright portion journaled in said bearing, a support mounted on the bearing concentric with the axle, a laterally swinging hand lever on an upright axis eccentric to the turning axis of said wheel pivoted between its ends to the support eccentric to said upright portion of the axle, one arm of the lever being provided with a rack arranged on the opposite side of the axle from that on which the pivot of the lever is located, and a gear mounted on the upright portion of the axle and meshing with the rack, the support being adjustable about the bearing to different angular relations relatively thereto, substantially as and for the purpose described.

In testimony whereof, I have hereunto signed my name, at Syracuse, in the county of Onondaga, and State of New York, this 2nd day of February, 1918.

WILLIAM H. LEE.

Certificate of Correction.

It is hereby certified that in Letters Patent No. 1,495,601, granted May 27, 1924, upon the application of William H. Lee, of Syracuse, New York, for an improvement in " Sulky Plows," errors appear in the printed specification requiring correction as follows: Page 2, line 87, claim 4, strike out the words " laterally swinging hand "; same claim, lines 87, 88, and 89, strike out the phrase " on an upright axis eccentric to the turning axis of said wheel "; and that the said Letters Patent should be read with these corrections therein that the same may conform to the record of the case in the Patent Office.

Signed and sealed this 19th day of August, A. D. 1924.

[SEAL.]
KARL FENNING,
*Acting Commissioner of Patents.*